(12) United States Patent
Hand (10) Patent No.: US 8,170,390 B2
(45) Date of Patent: May 1, 2012

(54) CABLE GLANDS

(75) Inventor: Edward Hand, Stalybridge (GB)

(73) Assignee: Hubbell Limited, London (GB)

( * ) Notice: Subject to any disclaimer, the term of this patent is extended or adjusted under 35 U.S.C. 154(b) by 155 days.

(21) Appl. No.: 12/440,335

(22) PCT Filed: Sep. 10, 2007

(86) PCT No.: PCT/GB2007/003398
§ 371 (c)(1),
(2), (4) Date: Mar. 6, 2009

(87) PCT Pub. No.: WO2008/029165
PCT Pub. Date: Mar. 13, 2008

(65) Prior Publication Data
US 2010/0003001 A1    Jan. 7, 2010

(30) Foreign Application Priority Data

Sep. 9, 2006 (GB) .................................. 0617776.0
Jun. 15, 2007 (GB) .................................. 0711576.9

(51) Int. Cl.
*G02B 6/00* (2006.01)

(52) U.S. Cl. ............................................ 385/134
(58) Field of Classification Search .................. None
See application file for complete search history.

(56) References Cited

U.S. PATENT DOCUMENTS

| | | | | |
|---|---|---|---|---|
| 5,621,191 A * | 4/1997 | Norris et al. | ............... | 174/653 |
| 6,259,029 B1 * | 7/2001 | Hand | .................... | 174/74 R |
| 6,268,565 B1 * | 7/2001 | Daoud | .................... | 174/657 |
| 6,809,263 B2 * | 10/2004 | Jackson | .................... | 174/651 |
| 7,641,396 B2 * | 1/2010 | Feldner | .................... | 385/56 |
| 7,781,685 B2 * | 8/2010 | Bartholoma et al. | ............ | 174/654 |
| 2003/0226680 A1 * | 12/2003 | Jackson | .................... | 174/65 SS |
| 2004/0069522 A1 * | 4/2004 | Jackson | .................... | 174/65 SS |
| 2004/0074662 A1 * | 4/2004 | Hand | .................... | 174/65 SS |
| 2008/0236861 A1 * | 10/2008 | Bartholoma et al. | .......... | 174/78 |

FOREIGN PATENT DOCUMENTS

| | | |
|---|---|---|
| EP | 0 047 188 | 3/1982 |
| EP | 1 077 517 A2 | 2/2001 |
| GB | 993282 | 5/1965 |

* cited by examiner

*Primary Examiner* — Sung Pak
(74) *Attorney, Agent, or Firm* — Greer, Burns & Crain, Ltd.

(57) ABSTRACT

A cable gland for a cable includes a body, an insert located within the body, the insert having an internal axial bore, and an adaptor provided with positive location structure arranged in use within the bore of the insert.

20 Claims, 8 Drawing Sheets

CABLE GLANDS

This invention relates to cable glands. The invention has particular, but not exclusive, applications to cable glands for electric cables, fibre optic cables and the like.

Cable glands are used in a wide range of applications when connecting electric cables to electrical equipment. In a common application, cable glands are used to seal cable entries to junction boxes or other electrical equipment for increased safety, particularly in hazardous environments where fire or explosion is a risk in order to avoid a flame path along the cable. In one type of known cable gland, the electrical conductors are embedded in a hardenable filler compound contained in a barrier sleeve located within the gland body. In another type of known cable gland, the electrical conductors pass through a diaphragm or compression seal supported to maintain engagement with the electrical conductors under a pressure differential across the seal. The known glands for these applications employ components designed for the intended application. These typically include components made of brass that are expensive to manufacture and there is a need for components that can be converted for different applications in a simple and cost effective manner.

The present invention has been made from a consideration of the foregoing problems.

A preferred object of the invention is to provide cable glands that can be configured for different applications and can be easily converted to a particular application.

Another preferred object of the invention is to provide a cable gland capable of maintaining sealing efficiency at high pressures, in particular under explosive conditions.

According to a first aspect of the invention there is provided a cable gland for a cable, the cable gland comprising a body, an insert having an internal axial bore, and an adaptor provided with positive location means arranged in use within the bore of the insert.

By this aspect of the invention, the insert can be configured for any selected one of a range of different applications by selection and fitment of the appropriate adaptor.

Preferably, the positive location means is an axially extending tubular portion of the adaptor that is received in the bore of the insert.

Preferably, a leading edge of the tubular portion is slightly chamfered to facilitate smooth insertion of the tubular portion into the bore of the insert Preferably, the adaptor and insert are provided with co-operating formations that engage when the tubular portion is inserted in the bore to connect the adaptor to the insert.

Preferably, the co-operating formations are configured to interlock when engaged to resist withdrawal of the tubular portion from the bore. In this way, once the adaptor has engaged with the insert, the two components are secured together and do not disengage easily.

Preferably, the co-operating formations comprise an inwardly projecting annular rib on the inner surface of the bore of the insert having a transverse abutment face co-operable with a transverse abutment face on the tubular portion of the adaptor to prevent axial separation of the insert and adaptor when engaged.

Preferably, the rib has a slightly chamfered face leading to the transverse abutment face for co-operating with tubular portion when the tubular portion is inserted in the bore to facilitate passage past the rib to engage the transverse abutment faces.

Alternative co-operating formations can be envisaged and the invention includes all possible configurations of co-operating formations to secure the two components together. It is desirable that the adaptor is axially located by such co-operating formations relative to the insert. It may be advantageous if the fit is also such as to inhibit rotational movement of the adaptor relative to the insert.

Preferably, the axial bore extends from a first end face of the insert and the adaptor has an external abutment that locates against the first end face when the co-operating formations engage.

Preferably, the first end face is configured to resist relative rotation between the insert and adaptor when the co-operating formations engage. In this way, insert and adaptor are locked together axially and rotatably when engaged. Thus, the first end face may be knurled, serrated or otherwise configured to resist relative rotation between the insert and adaptor.

Preferably, the knurls or serrations on the first end face are also configured to engage the tubular portion around the periphery of the bore at the first end face to resist relative rotation between the insert and adaptor.

Preferably, the axial bore of the insert comprises a counterbore terminating in an internal shoulder leading to an axial bore of reduced diameter that extends to a second end face of the insert.

Preferably, the tubular portion has an internal diameter that matches the axial bore of reduced diameter. In this way, an internal surface of the tubular portion is substantially contiguous with an inner surface of the axial bore of reduced diameter to provide a generally smooth surface of substantially uniform diameter between the first and second end faces of the insert.

Preferably, the insert is made of metal or alloy, for example brass, and the adaptor is made of plastics or elastomer rubber or other suitable material. In this way, the adaptor can be a relatively low cost moulded component and the insert can be configured to suit a particular application by selection and fitment of the appropriate adaptor.

Brass is an expensive material and employing an insert with an adaptor to produce a desired component uses less brass and so may reduce the cost of manufacture of the cable gland. Furthermore, assembly of the same insert with different adaptors may be used to produce a range of components for a variety of situations.

The adaptor may be configured to provide or assist a sealing function within the gland.

In one embodiment, the adaptor provides support for a cable seal. The cable seal may be detachable from the adaptor but more preferably the cable seal and adaptor are permanently secured together. For example, the seal may be moulded onto the adaptor.

In another embodiment, the adaptor provides support for one end of a barrier sleeve for receiving a hardenable filler compound. The adaptor may provide a seal between the filler compound and the barrier sleeve.

In another embodiment, the adaptor provides a seal for a cable, for example a lip seal, compression seal or diaphragm seal or any other type of seal as may be used in glands of the type embodying the invention.

According to a second aspect of the invention, there is provided a cable gland comprising an insert and an adaptor wherein the adaptor has a tubular portion received in an axial bore extending from an end face of the insert, and an abutment face locatable against the end face of the insert, wherein the end face of the insert is adapted to resist relative rotation between the insert and adaptor.

Preferably the end face of the insert is knurled, serrated or otherwise roughened or configured to resist relative rotation between the insert and adaptor.

Preferably, the tubular portion is secured in the axial bore to resist withdrawal of the tubular portion from the bore. The tubular portion may be secured by co-operating formations on the tubular portion and the inner surface of the bore as described previously in connection with the first aspect of the invention.

Preferably, the insert adaptor is configured to provide or assist a sealing function within the gland. The insert adaptor may have a support portion configured to locate and support a cable seal or barrier sleeve externally of the insert. Alternatively, the insert adaptor provides a cable seal, for example a lip seal, compression seal or diaphragm seal or any other type of seal as may be used in glands of the type embodying the invention.

According to a third aspect of the invention, there is provided in or for a cable gland, an insert and an insert adaptor connected together to produce a required gland component, wherein the insert is connectable to any selected one of a set of insert adaptors to configure the insert to the required gland component.

Preferably, the insert adaptor has a tubular portion received and secured in an axial bore of the insert or vice versa.

Preferably, the insert is made of metal or alloy such as brass and the insert adaptor is made of plastics such as nylon or polyester or an elastomer.

Preferably, the insert adaptor is secured axially and/or rotatably relative to the insert. For example, the insert adaptor may be secured axially in accordance with the first aspect of the invention and rotatably in accordance with the second aspect of the invention.

Preferably, the insert adaptor is configured to provide or assist a sealing function within the gland. The insert adaptor may have a support portion configured to locate and support a cable seal or barrier sleeve externally of the insert. Alternatively, the insert adaptor may incorporate a seal, for example a lip seal, or any other type of seal as may be used in glands of the type embodying the invention.

According to a fourth aspect of the invention there is provided a cable gland for a cable, the cable gland comprising a body, an insert within the body, an adaptor having a first portion located and secured within an axial bore of the insert and a second portion that supports a seal externally of the insert.

Preferably, the seal is securely located on the second portion to resist removal from the second portion in the normal course of use. More preferably, the seal and second portion are permanently attached to each other.

Preferably, the seal is moulded onto the second portion to be integral therewith. In this way, the seal and adaptor form a single component for fitment to the insert such that the seal cannot be assembled into a cable gland without its associated seal support thereby improving the effectiveness and safety of cable glands utilising the seal.

Preferably, the first portion of the adaptor is located and secured within the axial bore of the insert by positive location means similar to the positive location means of the adaptor according to the first aspect of the invention.

Preferably, the second portion of the adaptor has an abutment face that locates against an end face of the insert that is configured according to the second aspect of the invention to resist rotation of the adaptor relative to the insert when the adaptor is connected to the insert.

Preferably, the seal has a portion locatable against the end face of the insert when the adaptor is connected to the insert, and the end face is configured to resist relative rotation between the seal and the insert.

Preferably, the second portion of the adaptor and the seal have interengaging formations that resist axial separation of the seal and adaptor. In one preferred embodiment, the seal has an inwardly extending flange received in an outwardly facing groove in the adaptor.

Preferably, the adaptor and seal further comprise inwardly extending frusto-conical portions that extend away from the insert.

Preferably, the frusto-conical portion of the adaptor has radial slits that extend in the axial direction at least a part way along the frusto-conical portion from a free end thereof.

Preferably, the frusto-conical portion of the seal is provided with axially extending ribs on an inner surface thereof that are received in the slits and provide the frusto-conical portion of the seal with locally thickened regions that strengthen the seal and enhance sealing performance.

According to a fifth aspect of the invention there is provided a combined seal and seal support for a cable gland wherein the seal and seal support are provided with co-operating formations to axially and rotationally locate the seal relative to the seal support.

A particular advantage of this combination is that the seal is securely located on the seal support and is difficult if not impossible to remove therefrom in the course of normal use. Hence, in assembling the components of a cable gland, the seal will not be incorporated into the gland without the seal support. This improves the function and safety of the cable gland.

Preferably, a first tubular section of the seal and the seal support have co-operating location means to axially locate the seal relative to the seal support. The location means may comprise an internal annular flange on the seal received in an external annular groove in the seal support.

Preferably, the seal and seal support are configured for assembly to an insert received with the gland and the seal is provided with an inwardly extending lip that presents a resilient sealing face to an end face of the insert.

Preferably the seal and seal support comprise an overmolded integral component. For example, the seal may be moulded over the seal support.

According to a sixth aspect of the invention a method of manufacture of a seal and seal support for a cable gland comprises:
  moulding a seal support in a suitable mould;
  and moulding a seal thereon,
the seal and seal support having location means whereby the seal is axially and rotationally located on the seal support.

Preferably, the seal support and seal are moulded integrally in a twin shot mould.

Preferably, the seal support is made of plastics or any other suitable material. The seal support may be made of nylon or polyester. The seal support may be rigid or flexible.

Preferably, the seal is made of elastomer or any other suitable material. The seal may be made of rubber, silicone or neoprene or Santoprene (Registered Trade Mark). The seal is preferably resiliently deformable.

Preferably, the seal and seal support are configured for assembly to an insert received within the gland. For example, the seal support may have a tubular portion received and retained in an axial bore of the insert.

Preferably, the insert is made of metal or alloy or any other suitable material. A particularly preferred material is brass.

According to a seventh aspect of the present invention, there is provided a cable barrier gland for a cable having a sheath enclosing at least one conductor core, the gland comprising a body, a barrier sleeve locatable in the body wherein, in use, the at least one conductor core extends through the body and the sleeve and a hardenable compound is disposed in the sleeve filling the sleeve and surrounding the at least one core, and sealing means locatable at one end of the sleeve wherein, in use, the sealing means provides a seal between the sleeve and the hardenable compound within the sleeve.

By this aspect of the invention, the sealing means ensures the integrity of the gland is maintained such that, if a fault occurs in the bond between the sleeve and hardenable compound sufficient to allow passage of gas or liquid between the sleeve and the hardenable compound, the gas or liquid is contained and prevented from escaping by the sealing member. In this way, the risk of a fire or explosion being caused by permeation of gas or liquid through the gland can be eliminated. Furthermore, the sealing means performs this function irrespective of the material used for the sleeve.

Preferably, the sealing means comprises a tubular seal member having an end portion that is received within the barrier sleeve and is a clearance fit around the at least one conductor core such that the hardenable compound fills the barrier sleeve and the seal member. In this way, the end portion of seal member extends axially between the barrier sleeve and hardened compound to form a seal therebetween.

Preferably, the end of the barrier sleeve remote from the seal member is a clearance fit around the at least one conductor core. In this way, excess hardenable compound can exude from the barrier sleeve on fitment of the barrier sleeve around the hardenable compound surrounding the at least one conductor core in a controlled manner that allows the excess compound to be removed before the compound hardens.

Preferably, the seal member is arranged and adapted to seal between opposed end faces of the barrier sleeve and a support member. In a preferred arrangement, the seal member can be pre-assembled to the support member. For example, the seal member and support member may be provided with complementary formations that are engageable to connect the seal member to the support member. In a preferred arrangement, the support member and seal member are provided by the insert and insert adaptor of the preceding aspects of the invention.

In one embodiment, the body in which the barrier sleeve is locatable is an entry adaptor and the gland further comprises a compression sleeve threadably engageable with the entry adaptor to engage the sealing member with the barrier sleeve. Preferably, the support member is locatable in the compression sleeve and the seal member is axially located between the barrier sleeve and the support member by engagement of the compression sleeve with the entry adaptor.

In one arrangement suitable for use with cables having no armour or earth element, the support member comprises a cylindrical body that is received in and locates against an internal abutment shoulder within the compression sleeve. The body has a counterbore at the end remote from the abutment shoulder in which an end portion of the seal member is received and retained, for example by engagement of an internal flange or rib in the counterbore with an external groove in the end portion of the seal member or vice versa. Other engageable formations to secure the seal member may be employed.

In another arrangement suitable for use with cables having armour or earth element, the gland includes a clamping ring co-operable with the support member for clamping the cable armour or earthing element. Preferably, the clamping ring and support member are provided with opposed clamping faces, preferably tapered clamping faces, and the gland is arranged and adapted to urge the clamping ring and support member axially relative to each other to clamp the cable armour or earthing element between the clamping faces. In this arrangement, the support member has a counterbore at the end remote from the clamping face in which an end portion of the seal member is received and retained, for example by engagement of an internal flange or rib in the counterbore with an external groove in the end portion of the seal member or vice versa. Other engageable formations to secure the seal member may be employed.

In both arrangements, the seal member has an external annular flange between the ends that is located between the opposed end faces of the barrier sleeve and the support member and another end portion located between the barrier sleeve and the hardened compound when the gland is assembled and the compression sleeve tightened on the entry adaptor to urge the support member towards the barrier sleeve so as to provide a seal between the barrier sleeve and the hardened compound.

Preferably, the gland includes a cable seal urged to engage an outer sheath of the cable extending through the gland by engagement of a cap nut in which the cable seal is received with the compression sleeve.

The barrier sleeve may be made of any suitable materials. For example the barrier sleeve may be made of metals or alloys such as brass. Alternatively, the barrier sleeve may be made of plastics such as polycarbonate. Alternatively, the barrier sleeve may be made of resilient or elastic materials such as rubber or other elastomers.

Preferably, the seal member is made of a resilient or elastic material such as rubber although any suitable elastomers may be employed. Alternatively, the seal member may be made of a flexible plastics material such as Santoprene®.

According to an eighth aspect of the invention, there is provided a method of sealing a cable barrier gland in which one or more conductor cores of a cable extending through the gland are embedded in a hardenable compound contained in a barrier sleeve located within the gland, the method including the step of providing a seal member at one end of the barrier sleeve to form a seal between the barrier sleeve and the hardenable compound.

By this aspect of the invention, the sealing member prevents passage of gas or liquid through the gland if an incomplete or partial bond is formed or develops between the barrier sleeve and the hardenable compound. In this way, the integrity of the gland is maintained under all conditions whatever material the barrier sleeve is made of.

Preferably, the seal member has an end portion received in the barrier sleeve and extends axially between the barrier sleeve and hardened compound to form seal therebetween.

The invention will now be further described, by way of example only, with reference to the following drawings in which.

Figure 1:
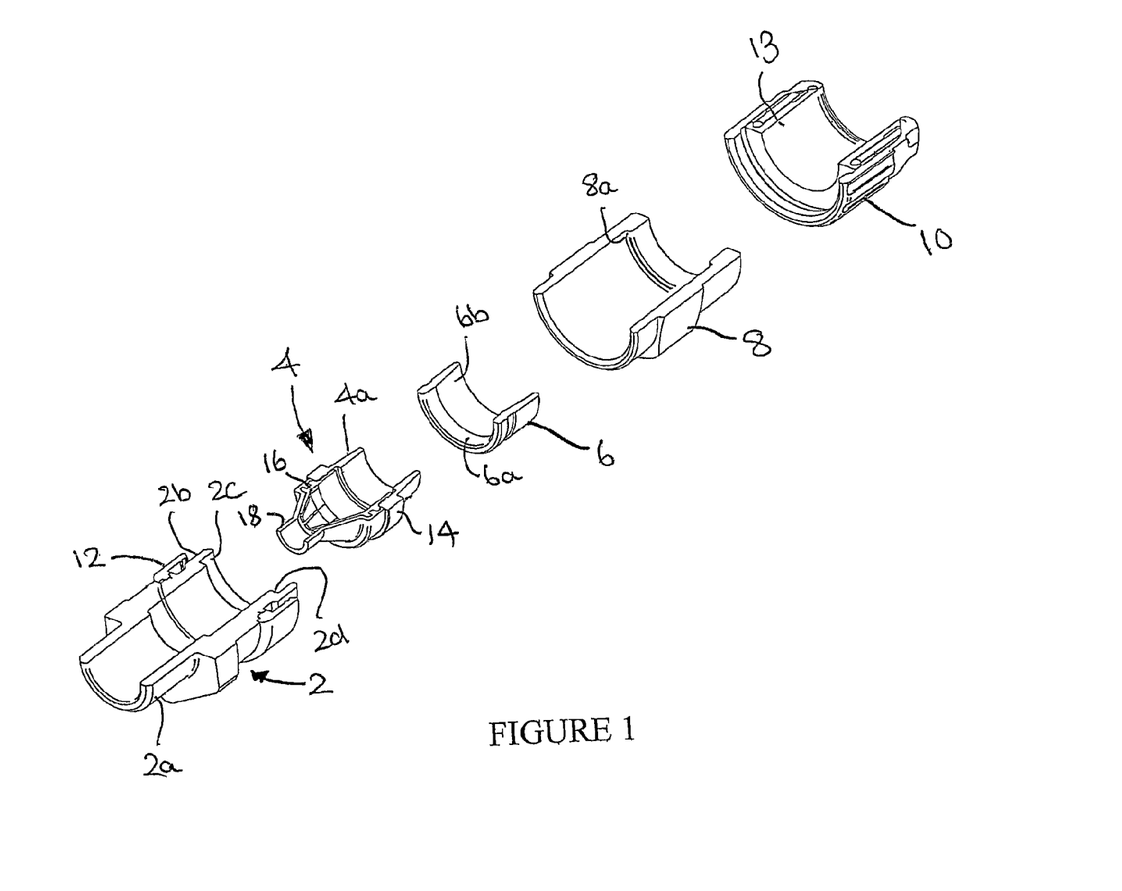
FIG. 1 is an exploded cross sectional view of a cable gland according to a first embodiment of the invention.

Referring to FIG. 1 of the drawings, a cable gland according to a first embodiment of the invention is shown comprising an entry adaptor 2, a combined insert, insert adaptor and seal assembly 4, an armour clamping ring 6, a compression sleeve 8 and a back nut 10. The component parts of the gland are arranged and adapted to be co-axially assembled around an armour cable (not shown) having woven or braided metal armour disposed between an outer sheath or jacket of electrically insulating material and an inner sheath of electrically insulating material surrounding one or more conductors.

The entry adaptor 2 has a spigot 2a at one end for insertion in an opening in a junction box (not shown) or the like through which the conductors extend for connection to terminals within the junction box. The spigot 2a is externally threaded for mounting a locknut (not shown) to secure the entry adaptor 2a to the junction box. Alternatively, the opening in the junction box may be tapped for mating engagement with the external thread on the spigot 2a.

The other end portion 2b of the entry adaptor 2 is externally threaded and has a counterbore 2c terminating in an internal shoulder 2d providing an abutment for locating the combined seal, seal support and insert assembly 4. An end portion of the assembly 4 projects from the counterbore 2c at the end the entry adaptor 2 and has an external tapered surface 4a for co-operating with an internal tapered surface 6a of the clamping ring 6 to secure the cable armour therebetween.

In this embodiment, the clamping ring 6 is reversible for presenting a selected one of two tapered surfaces 6a, 6b for co-operating with the tapered surface 4a of the assembly 4 for accommodating different thicknesses of cable armour. Such a reversible clamping ring forms the subject matter of our granted European patent No.0587310. This is not essential, however, and any other suitable clamping ring may be employed.

The clamping ring 6 is received in the compression sleeve 8 and locates at the end remote from the assembly 4 against an internal shoulder 8a of the compression sleeve 8. The compression sleeve 8 has an internally threaded portion at one end engageable with the externally threaded end portion 2b of the entry adaptor 2 to urge the clamping ring 6 axially towards the assembly 4 to clamp cable armour between the opposed tapered surfaces and to locate the assembly 4 against the internal shoulder 2d of the entry adaptor 2.

A rubber boot 12 mounted on the entry adaptor 2 extends axially with radial clearance over the externally threaded end portion 2b of the entry adaptor 2 and terminates in an inwardly directed lip that slidably and rotatably engages the outer surface of the compression sleeve 8 to provide a seal between the entry adaptor 2 and compression sleeve 8 that prevents moisture penetrating along the threads and thereby reduces the risk of corrosion of the cable armour.

The back nut 10 is provided with a cable seal 13 and has an internally threaded portion engageable with an externally threaded end portion of the compression sleeve to compress the seal 13 to engage the outer jacket or sheath of the cable (not shown) extending through the gland.

Figure 2:
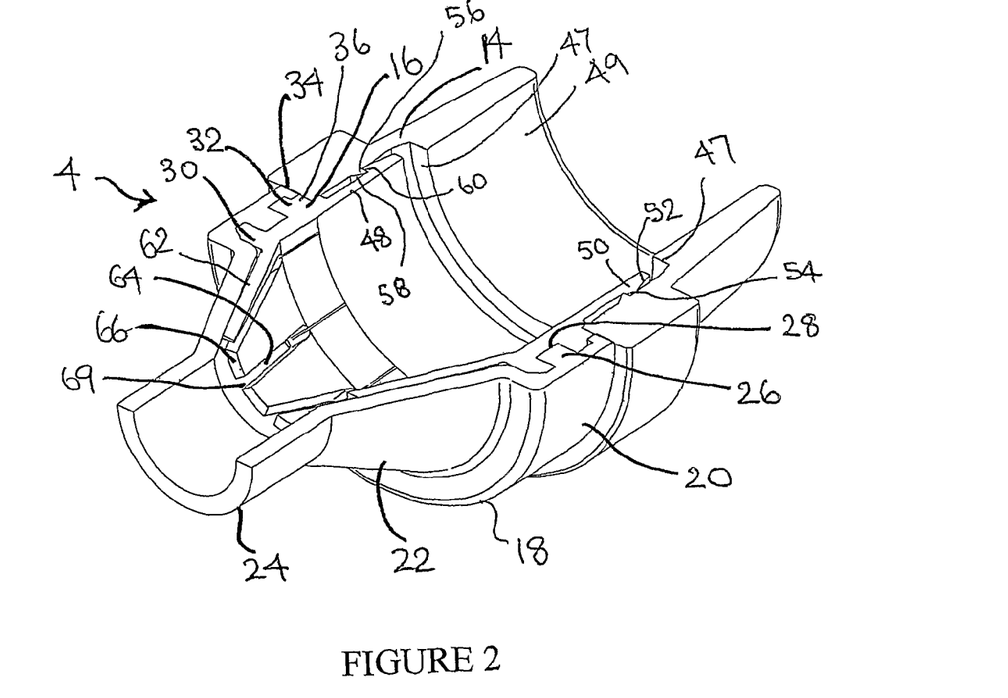
FIG. 2 is an enlarged cross-section view of the seal, seal support and insert of the cable gland shown in FIG. 1.
Figure 3:
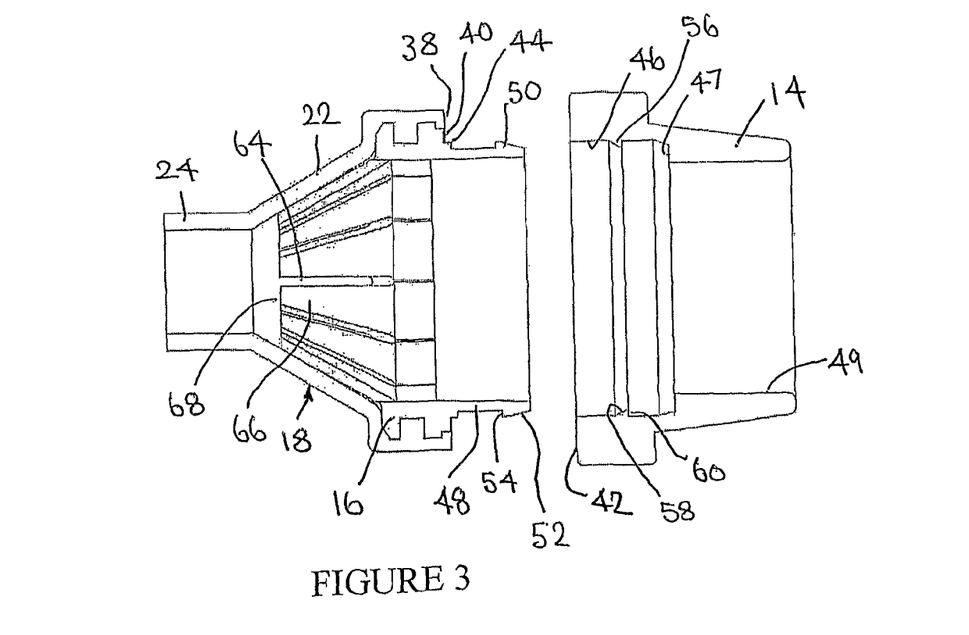
FIG. 3 is a cross-sectional view of the combined seal and support before location on the insert of the cable gland shown in FIG. 1.

The combined insert, insert adaptor and seal assembly 4 is shown in more detail in FIGS. 2 and 3 and comprises insert 14, insert adaptor 16 and seal 18. The insert 14 is made of metal or alloy such as brass. The insert adaptor 16 is made of plastics such as nylon or polyester. The seal 18 is made of a flexible, resilient elastomer such as rubber, neoprene or other suitable material. In this embodiment, the seal 18 is moulded onto an end portion of the insert adaptor 16 to be integral therewith. For example, the seal 18 and insert adaptor 16 may be a twin shot injection moulding. This is not essential, however, and the seal 18 and insert adaptor 16 could be made separately and assembled together either permanently with adhesive to bond the seal 18 to the insert adaptor 16 or releasably.

The seal 18 comprises a first cylindrical portion 20, an inwardly angled frusto conical diaphragm portion 22 and a second cylindrical portion 24 coaxial with the first cylindrical portion 20 and of reduced diameter to engage and seal around the inner sheath containing the cable conductor(s).

The first cylindrical portion 20 is provided with an inwardly directed flange 26 that engages in a channel 28 formed between two outwardly extending flanges 30,32 on the insert adaptor 16 to assist in axially locating and retaining the seal 18 relative to the insert adaptor 16. The first cylindrical portion 20 is also provided with an inwardly extending lip 34 that locates over a stepped portion 36 of the flange 32 of the insert adaptor 16.

As best shown in FIG. 3, an end face 38 of the seal 16 and shoulder 40 of the stepped portion 36 of the insert adaptor 16 form a planar abutment surface adapted to seat on an end surface 42 of the insert 14 when the insert adaptor 16 is attached to the insert 14 as described later herein.

The whole or part of the end surface 42 is knurled, serrated or otherwise roughened (not shown) to resist rotation of the seal 18 and insert adaptor 16 relative to the insert 14. In addition, the shoulder 40 of the stepped portion 36 of the insert adaptor 16 terminates at an axially extending ledge 44 that is received in a counterbore 46 extending axially within the insert 14 from end surface 42. The counterbore 46 terminates at an internal shoulder 47 leading to an axial bore 49 of reduced diameter coaxial with the counterbore 46 and extending to the other end of the insert 14.

We have found that the roughening applied to the surface 42 tends to produce sharp edges around the periphery of the counterbore 46 that bite into the plastic material of the ledge 44 to further resist rotation of the insert adaptor 16 and seal 18 mounted thereon relative to the insert 14.

The ledge 44 leads to a tubular portion 48 of the insert adaptor 16 that is received in the counterbore 46 of the insert 14 and is provided at the distal end with an external annular collar 50 having a tapered leading face 52 terminating in a transverse locking face 54. The counterbore 46 is provided with an internal annular rib 56 having a tapered leading face 58 terminating in a transverse locking face 60.

The tubular portion 48 of the insert adaptor 16 is a push-fit in the counterbore 46 to locate the transverse locking face 54 of the collar 50 at the distal end behind the transverse locking face 60 of the rib 56 to locate and axially retain the tubular portion 48 within the counterbore 46 to attach the insert adaptor 16 to the insert 14.

The engagement of the locking faces 54,60 is assisted by engagement of the tapered leading faces 52,58 as the tubular portion 48 is inserted into the counterbore 46 such that the collar 50 rides over and engages behind the rib 56 to resist axial separation of the insert adaptor 16 and insert 14.

The collar 50 and rib 56 are positioned so that, when engaged to lock the insert adaptor 16 and insert 14 together, the end face 38 of the seal and the shoulder 40 of the insert adaptor 16 are held tightly against the roughened end surface 42 of the insert 14 to optimise the interaction therebetween to resist rotation of the insert adaptor 16 relative to the insert 14.

In this way, the insert 14 and insert adaptor 16 are locked together both to resist axial separation and relative rotation.

The frusto-conical portion 22 of the seal 18 is supported on the inner surface by a frusto-conical portion 62 of the insert adaptor 16 that is provided with slits 64 approximately 1 mm wide extending axially and radially from the free end to form flexible tongues 66 defining an aperture 68 at the free end coaxial with and of slightly larger diameter than the second cylindrical portion 24 of the seal 18. The tongues 66 can deflect to change the size of the aperture 68 to accommodate cable inner sheaths of different diameter.

The frusto conical portion 22 of the seal 18 is provided on the inner surface with ridges 69 that locate in the slits 64 of the insert adaptor 16 thereby increasing the thickness of the seal 18 which has the advantage of strengthening the seal 18 and providing enhanced sealing performance when a pressure differential exists across the seal 18 such as may occur following an explosion in the junction box or other equipment to which the gland is connected.

Figure 4:
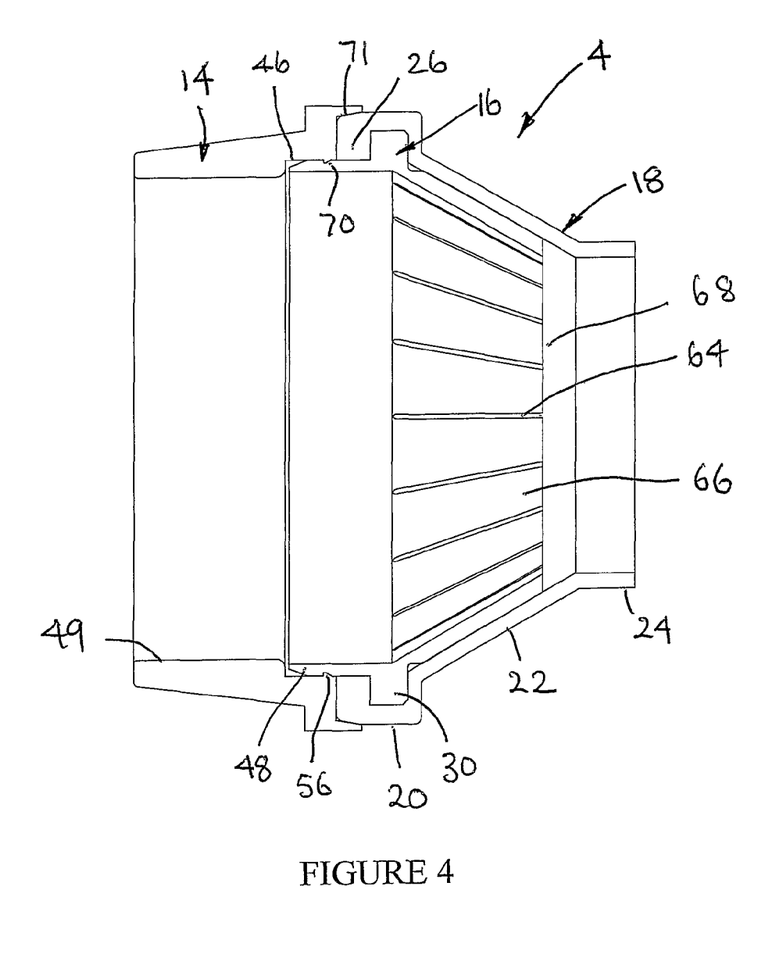
FIG. 4 shows a modification to the insert, insert adaptor and seal assembly of the gland shown in FIGS. 1 to 3.

Referring now to FIG. 4 of the drawings, there is shown a modification to the insert, insert adaptor and seal assembly 4 of the cable gland described above with reference to FIGS. 1 to 3. For convenience, like reference numerals are used to indicate corresponding parts.

In this modification, the insert adaptor 16 and seal 18 are formed separately and the seal 18 fitted on the insert adaptor 16 by locating the end portion 20 of the seal over external flange 30 on the insert adaptor 16. The tubular portion 48 of the insert adaptor 16 is a push-fit in the counterbore 46 of the insert 14 to engage the internal rib 56 within the counterbore 46 in a matching annular groove 70 in the outer surface of the tubular portion 48 to locate and axially retain the tubular portion 48 within the counterbore 46 to attach the assembled insert adaptor 16 and seal 18 to the insert 14. The insert 14, insert adaptor 16 and seal 18 may be made of materials similar to those employed for the same parts in the previous embodiment.

The counterbore 46 opens to an enlarged counterbore 71 at the end of the insert 14 in which internal flange 26 of the seal 18 is received when the insert adaptor 16 is secured to the insert 14. As shown, the external flange 30 defines with the end of the insert 14 a portion of reduced cross-section relative to the flange 26 thereby trapping the flange 26 between the insert 14 and insert adaptor 16. In this way, the seal 18 is retained in position on the insert adaptor 16 both during assembly and in use without the use of adhesives to permanently attach the seal 18 to the insert adaptor 16 thereby simplifying production by eliminating the associated cleaning/priming stages required if adhesive is used to secure the seal 18 to the insert adaptor 16. The counterbore 71 is slightly tapered to facilitate insertion of the flange 26 and to compress the flange 26 in a radial direction that may assist in preventing rotation of the insert adaptor 16 and seal 18 relative to the insert 14.

The frusto-conical portion 22 of the seal 18 may be provided with ridges that locate in the slits 64 of the insert adaptor 16 as described above. Alternatively, the ridges may be omitted. In other respects, the construction and operation of the gland with the modified combined insert, insert adaptor and seal assembly 4 is similar to and will be understood from the description of the previous embodiment.

Figure 5:
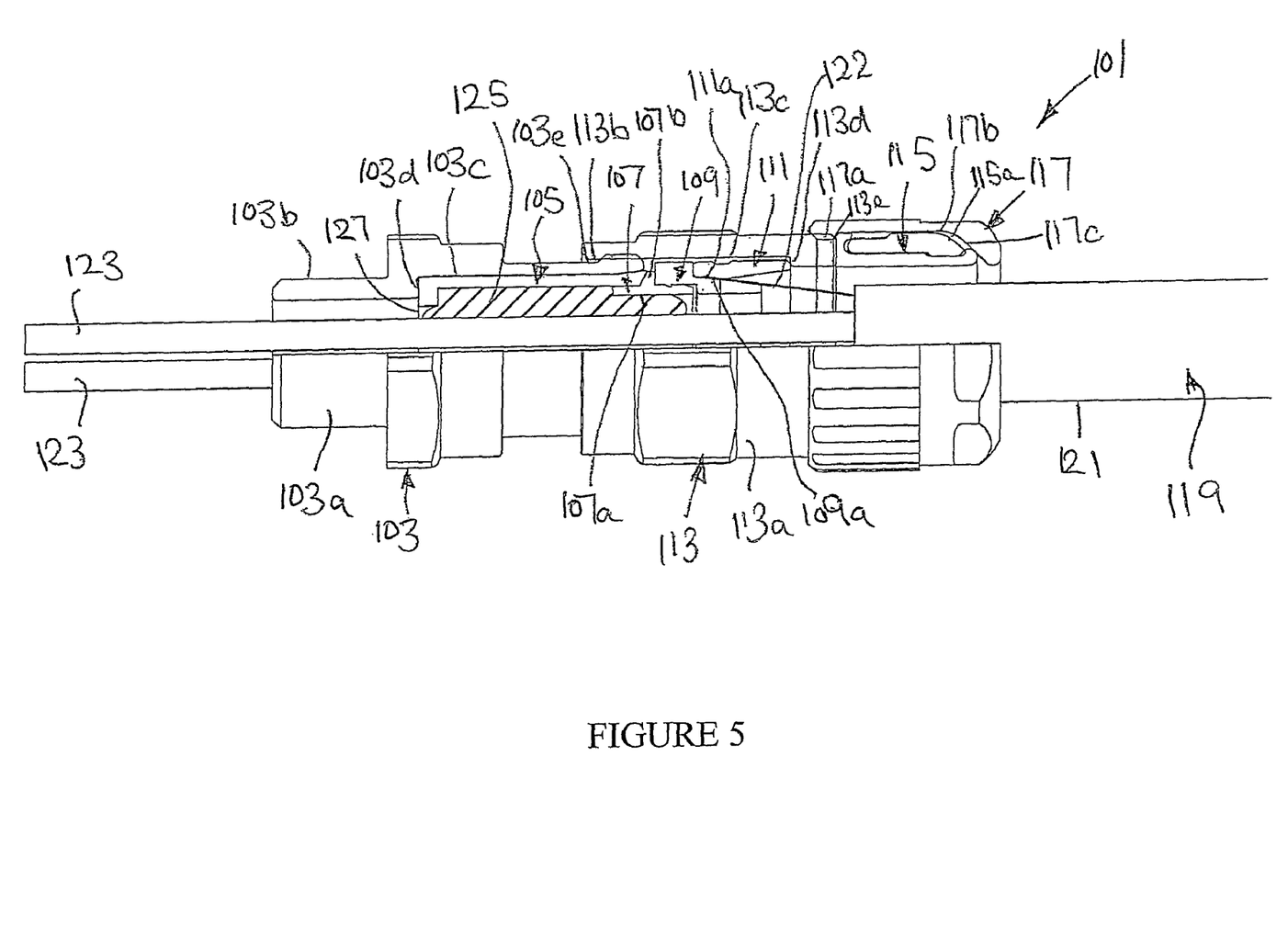
FIG. 5 is a longitudinal view of a cable barrier gland according to a second embodiment of the invention showing one half of the gland in section and with the hardenable compound in situ within the barrier sleeve.
Figure 6:
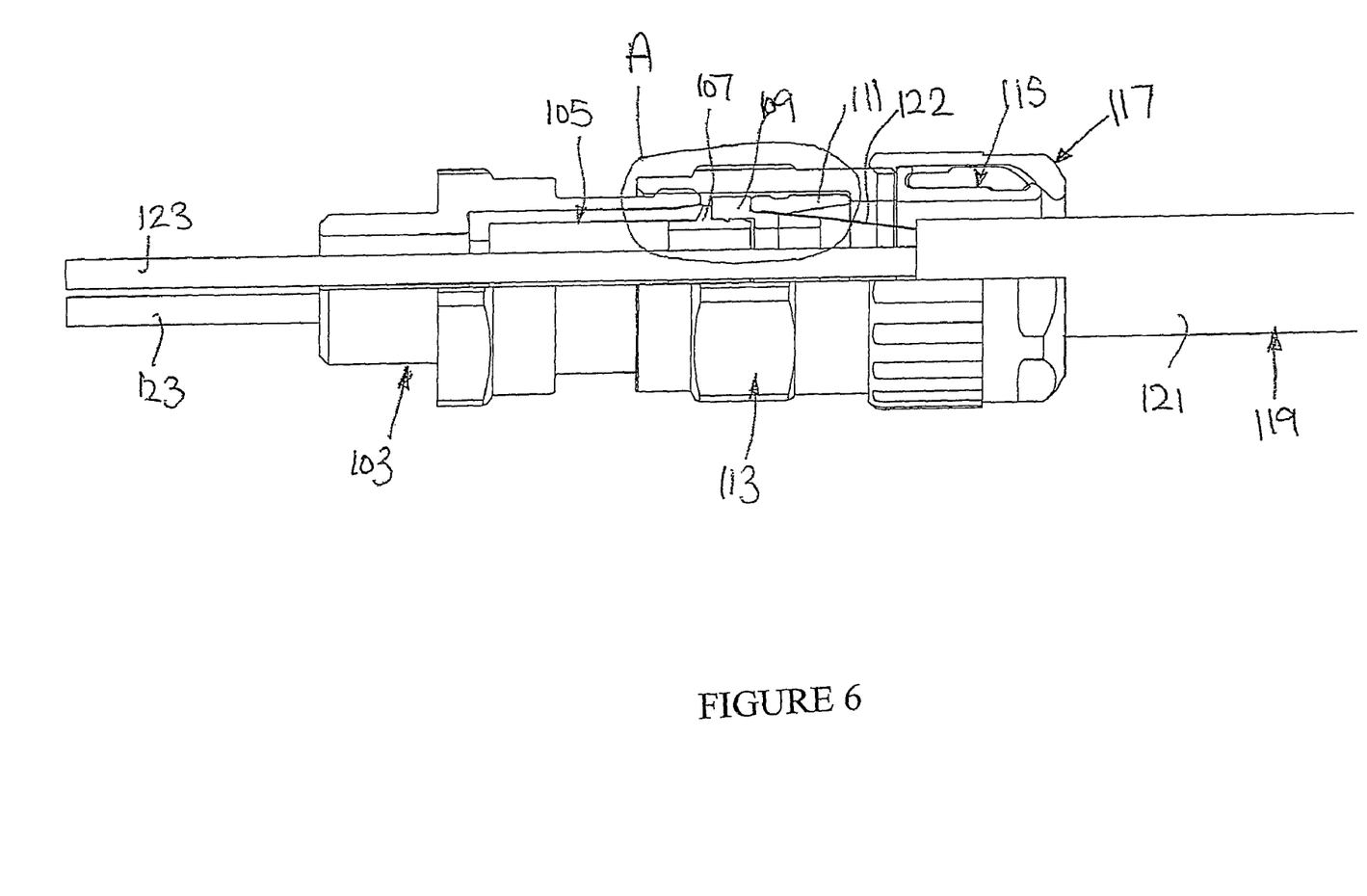
FIG. 6 is a longitudinal view of the gland shown in FIG. 5 with the hardenable compound omitted.
Figure 7:
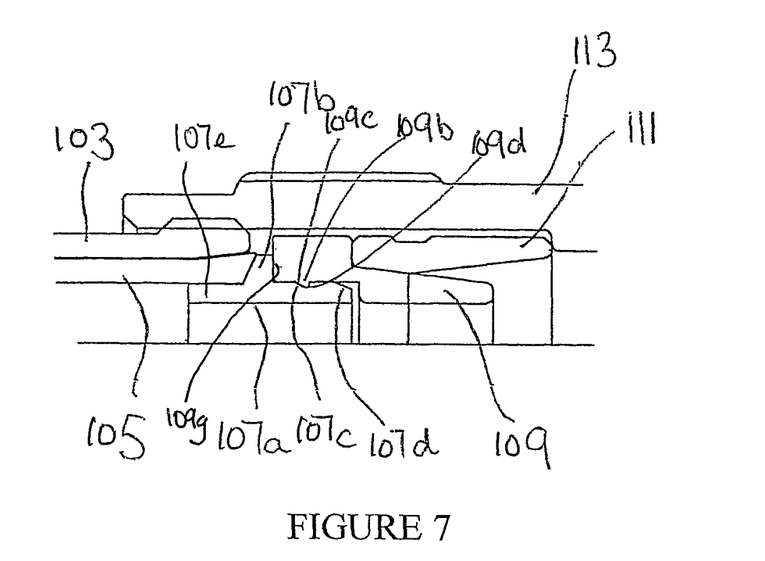
FIG. 7 is an enlarged view of the area A in FIG. 6.

Referring now to FIGS. 5 to 7 of the drawings, a cable barrier gland 101 according to a second embodiment of the invention is shown in which the insert adaptor 16 and seal member 18 of the first embodiment are replaced by insert adaptor or seal member 107 which performs a sealing function as described later.

The gland 101 comprises an entry adaptor 103, a barrier sleeve 105, insert adaptor 107, insert 109, clamping ring 111, compression sleeve 113, cable seal 115 and cap nut 117. The parts of the gland 101 are arranged and adapted to be co-axially assembled around an electric cable 119 extending through the gland 101 as shown in the Figures.

The entry adaptor 103 has a tubular body 103a with an external screw thread 103b at one end for connecting the adaptor 103 to a threaded bore of an electrical fitting for entry and connection of the cable 119 in known manner.

The barrier sleeve 105 is cylindrical and is a close fit in a cylindrical counterbore 103c extending from the other end of the adaptor 103 to locate against an internal shoulder 103d at the inner end of the counterbore 103c.

The compression sleeve 113 has a tubular body 113a with an internal screw thread 113b at one end for engagement with an external screw thread 103e on the other end of the tubular body 103a of the entry adaptor 103.

The clamping ring 111 is of annular ring shape and is a close fit in a cylindrical counterbore 113c extending from said one end of the compression sleeve 113 to locate against an internal shoulder 113d at the inner end of the counterbore 113c.

The insert 109 is also of annular ring shape and is a close fit in the counterbore 113c to position an external tapered clamping surface 109a opposite an internal tapered clamping surface 111a of the clamping ring 111 for a purpose described later.

The insert adaptor 107 is made of neoprene or other suitable elastomeric material and has a cylindrical body 107a with an external annular flange 107b intermediate the ends. The body 107a is sized to be a close fit in the barrier sleeve 105 and insert 109 with the flange 107b located between opposed end faces of the barrier sleeve 105 and the insert 109.

The insert adaptor 107 can be pre-assembled to the insert 109 to facilitate assembly. In this way, the insert 109 acts as a support member for the insert adaptor 107. For this purpose, an annular groove 107c is formed in the end portion of the insert adaptor 107 received in the insert 109 and an internal annular flange 109b in the bore of the insert 109 is located in the groove 107c to lock the insert 109 and insert adaptor 107 together to resist axial separation. The flange 107b is held tightly against end surface 109g of the insert 109 which can be roughened as described previously to resist relative rotation between the insert 109 and the insert adaptor 107.

As shown, an external annular tapered surface 107d is provided at the end of the insert adaptor 107 received in the bore of the insert 109 and the internal flange 109b has a tapered lead-in face 109c on one side that co-operates with the tapered surface 107d to facilitate insertion of the end of the insert adaptor 107 in the bore of the insert 109.

The tapered lead-in face 109c of the internal flange 109b terminates in radially extending stop face 109d and the groove 107c is of complementary shape to the flange 109b so that the end portion of the insert adaptor 107 locates behind the stop face 109d to secure and retain the insert adaptor 107 in the pre-assembled position on the insert 109.

The cap nut 117 has a tubular body with an internal screw thread 117a at one end for engagement with an external screw thread 113e at the other end of the compression sleeve 113 remote from the barrier sleeve 115.

The cable seal 115 is received in an annular recess 117b within the cap nut 117 and engages an internal abutment shoulder 117c at the other end of the cap nut 117.

The shoulder 117c is tapered and co-operates with a tapered end portion 115a of the cable seal 115 to urge the cable seal 115 radially inwards to seal around the electric cable 119 when the cap nut 117 is tightened on the compression sleeve 113.

The assembly and operation of the gland 101 will now be described.

The cable 119 has an outer sheath 121 over which the cap nut 117 together with the cable seal 115 therein and the compression sleeve 113 loosely threaded thereto are slid. The outer sheath 121 is then cut back from the end of the cable 119 to expose a cable armour or earthing element 122 surrounding one or more conductor cores 123 (two shown but it will be understood any number of cores may be provided according to the electrical connections of a given installation).

The cable armour or earthing element 122 is then cut back and positioned between the opposed tapered clamping faces 109a,111a of the insert 109 and clamping ring 111 with the exposed conductor cores 123 projecting from the insert adaptor 107 that is secured to the insert 109.

The projecting conductor cores 123 are then passed through the entry adaptor 103 which has been screwed to the electrical fitting (not shown) and the compression sleeve 113 screwed to the entry adaptor 103 by engaging of the mating screw threads 113b,103a to clamp the cable armour or earthing element 122 between the tapered faces 109a,111a of the insert 109 and clamping ring 111.

The compression sleeve 113 is then released from the entry adaptor 103 and the conductor cores 123 withdrawn from the entry adaptor 103. A hardenable compound 125 such as an epoxy resin having the consistency of putty or plasticine is than placed around and between the exposed conductor cores 123 to fill any voids between the cores 123.

In this condition, before the compound 125 hardens, the barrier sleeve 105 is slid onto the end of the cable 119 and pushed over the cores 123 with the hardenable compound 125 packed therearound and onto end portion 107e of the insert adaptor 107 to locate against the external flange 107b of the insert adaptor 107.

The hardenable compound 125 fills the barrier sleeve 105 and the cylindrical body 107a of the insert adaptor 107. The end of the barrier sleeve 105 remote from the insert adaptor 107 is a clearance fit around the cores 123 to leave an annular gap 127 through which any excess hardenable compound 125 can exude.

After cleaning away any excess hardenable compound 125, the cable cores 123 are passed through the entry adaptor 103 which has been screwed to the electrical fitting (not shown) and the barrier sleeve 105 inserted into the counterbore 103c of the adaptor 103 and the compression sleeve 113 screwed onto the entry adaptor 103 and hand tightened to pull the gland together and compress the barrier sleeve 105 onto the compound 125 which is left to cure and harden.

Once the compound 125 has hardened, the compression sleeve 113 is tightened on the adaptor 103 with a spanner or similar tool (not shown) so that the external flange 107b of the insert adaptor 107 is axially compressed between the opposed end faces of the barrier sleeve 105. End portion 107e of the insert adaptor 107 provides a seal between the barrier sleeve 105 and the compound 125.

Finally, the cap nut 117 is tightened on the compression sleeve 113 to compress and urge the cable seal 115 into engagement with the outer sheath 121 of the cable 119.

Figure 8:
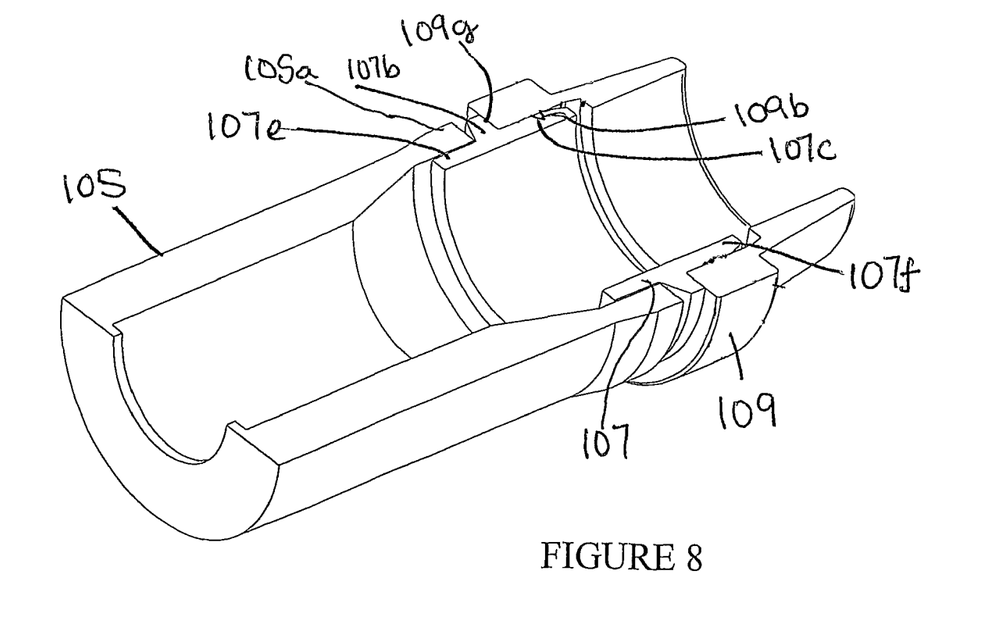
FIG. 8 shows a modification to the gland of FIGS. 5 to 7.

FIG. 8 shows a modification to the barrier cable gland of FIGS. 5 to 7 in which like reference numerals are used to indicate corresponding parts. The barrier sleeve 105 may be made of metal or plastics or an elastomer. The insert adaptor 107 may be made of plastics or an elastomer.

The barrier sleeve 105 is configured to be received in the counterbore in the entry adaptor and is located at one end against an internal shoulder within the counterbore (FIG. 5). In use, the barrier sleeve 105 contains a hardenable filler compound (not shown) that is packed around individual conductors of the cable extending through the gland.

The insert adaptor 107 has a tubular end portion 107e received in the other end of the barrier sleeve 105, an external flange 107b intermediate the ends that locates between the end of the barrier sleeve 105 and end surface 109e of the insert 109, and another tubular end portion 107f received in the counterbore of the insert 109.

The end portion 107f of the insert adaptor 107 is secured in the counterbore of the insert 109 by engagement of internal flange or rib 109b in annular groove 107c as described previously to lock the insert 109 and insert adaptor 107 together to resist axial separation. The flange 107b is held tightly against the roughened end surface 109g of the insert 109 to resist relative rotation between the insert 109 and the insert adaptor 107.

The end portion 107e of the insert adaptor 107 is received in end portion 105a of the barrier sleeve 105 which is of increased diameter and provides a seal between the barrier sleeve 105 and the hardenable filler compound to maintain sealing efficiency if the bond between the filler compound and the barrier sleeve 105 is broken.

Figure 9:
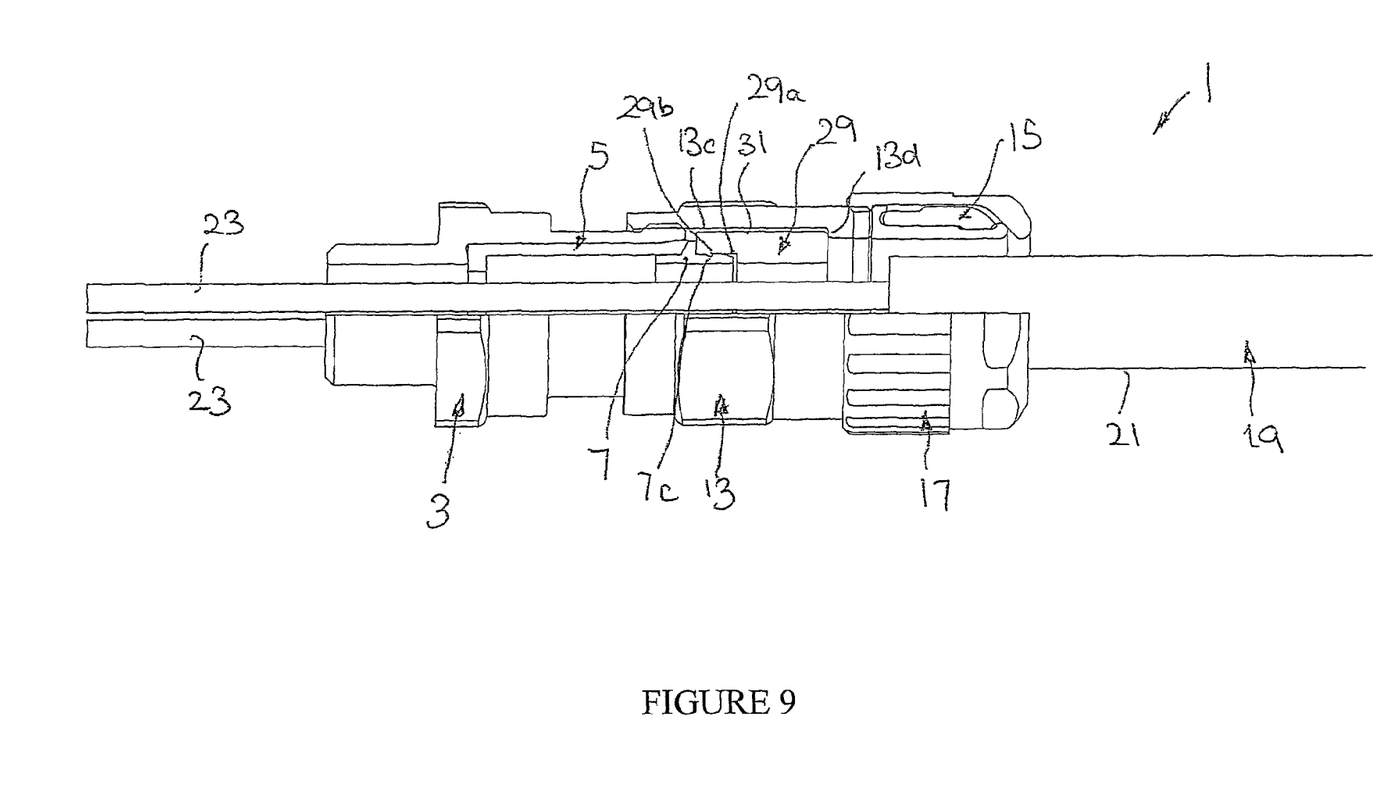
FIG. 9 is a longitudinal view of a cable barrier gland according to a third embodiment of the invention showing one half of the gland in section and with the hardenable compound in situ within the barrier sleeve.

Referring now to FIG. 9, a cable barrier gland according to a third embodiment of the invention is shown in which parts corresponding to the second embodiment have the same reference numbers and are not described in detail. In this third embodiment, the cable armour or earth element 122 and clamping ring 111 are omitted and the insert 109 replaced by insert 129 for the insert adaptor 107.

The insert 129 has a cylindrical body 131 that is received in the counterbore 113c of the compression sleeve 113 and locates at one end against the internal shoulder 113d so as to be urged axially towards the barrier sleeve 105 when the compression sleeve 113 is tightened on the entry adaptor 103.

The other end of the insert 129 has a counterbore 129a to receive the end portion of the insert adaptor 107 and is provided with an internal annular flange 129b that locates in the annular groove 107c of the insert adaptor 107 to attach the insert adaptor 107 to the insert 129.

In other respects the construction, assembly and operation of the gland 101 is similar to the second embodiment and will be understood from the description of the first embodiment As will be appreciated from the description of the second and third embodiments, the insert adaptor 107 provides a seal between the barrier sleeve 105 and the hardenable compound 125 contained in the sleeve 105.

As a result, if the compound 125 only partially bonds to the internal circumference of the barrier sleeve 105 so that a fluid path is formed between the compound 125 and the barrier sleeve 105 that extends the whole length of the barrier sleeve 105, any gas or liquid that enters the gland is contained by the insert adaptor 107 and prevented from escaping.

In this way, the effectiveness of this seal is independent of the material from which the barrier sleeve 105 is made and the integrity of the gland 101 is assured whether the barrier sleeve 105 is made of metal such as brass, elastomer such as Santoprene® or plastic such as polycarbonate or any other materials as will be familiar to those skilled in the art.

Figure 10:
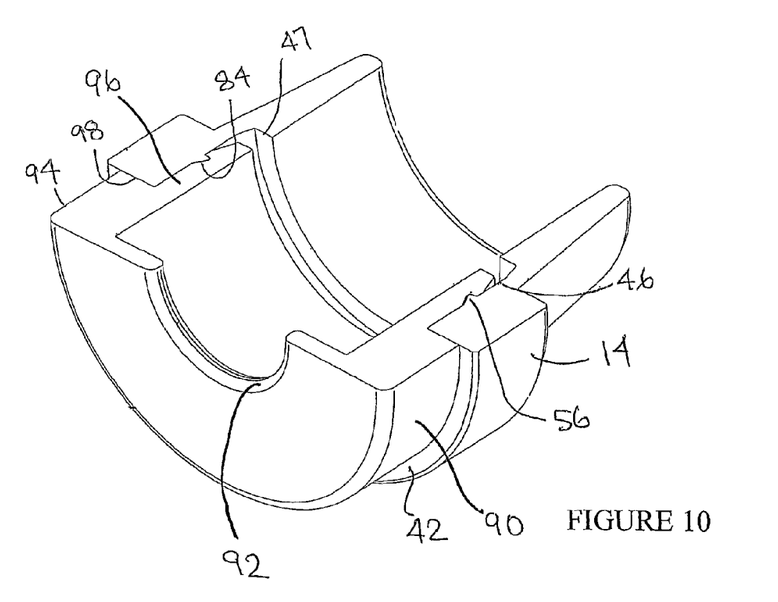
FIGS. 10 and 11 are cross-sectional views of further embodiments of the invention.

Referring now to FIGS. 9 and 10 of the drawings, alternative embodiments of the invention are shown in which the insert adaptor 16 and seal 18 of the cable gland shown in FIG. 1 are replaced by alternative components for assembly with the insert 14 to adapt the gland for different applications. In other respects the glands are similar to the gland shown in FIG. 1. Where appropriate, like reference numerals are used to indicate parts similar to FIG. 1

FIG. 10 shows an arrangement for a cable gland in which the insert 14 is assembled with an insert adaptor 90 provided with a lip seal 92 for a low-pressure application. The insert adaptor 90 may be made of plastics or an elastomer.

The lip seal 92 is provided at one end of a cylindrical body 94 and extends radially inwards to define an opening for passage of the electrical conductors. The other end of the body 94 is provided with a tubular projection 96 similar to the end portion 80 of the insert adaptor 72 described previously that is a push fit in the counterbore 46 of the insert 14 to engage the internal annular rib 56 of the insert 14 in the groove 84 so that the insert 14 and insert adaptor 90 are locked together to resist axial separation and transverse end face 98 of the body 94 is held tightly against the roughened end surface 42 of the insert to resist relative rotation between the insert 14 and the insert adaptor 90.

Figure 11:
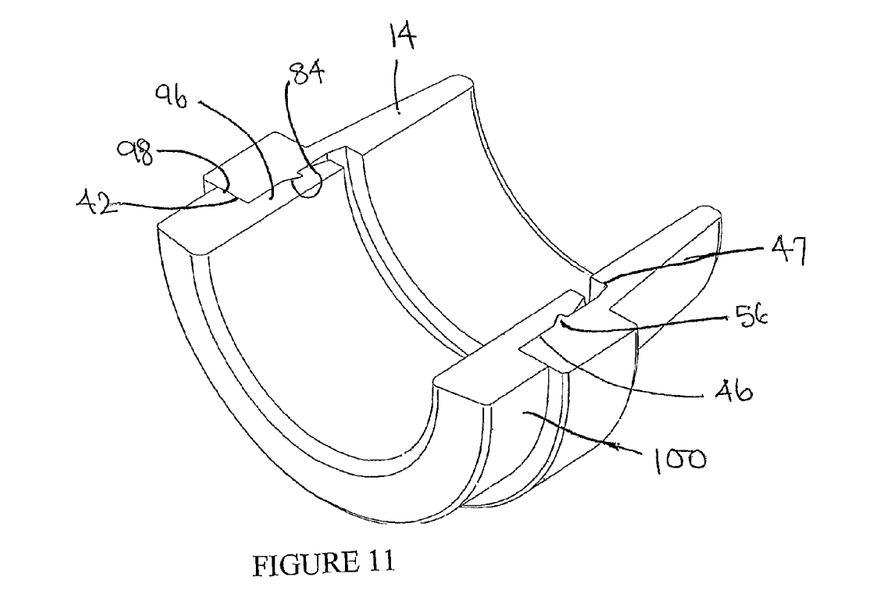

FIG. 11 shows an arrangement for a cable gland in which the insert 14 is assembled with an insert adaptor 100 for an application in which a cable seal is not required. The insert adaptor 100 may be made of plastics or an elastomer. The insert adaptor 100 is similar to the insert adaptor 90 shown in FIG. 10 with the lip seal 92 omitted and the construction and assembly of the insert adaptor 100 with the insert 14 will be understood from the description of FIG. 10.

As will be apparent from the foregoing description of exemplary embodiments, a common insert component can be assembled with any selected one of a range of insert adaptor components to configure the insert for the intended application of the gland. The insert component is typically made of metal or alloy, usually brass and, as the insert adaptor is preferably made of plastic or elastomer material, a number of different insert adaptors can be readily and relatively inexpensively manufactured, for example by injection moulding. A variety of insert adaptors for assembly with a common insert may be produced at relatively low cost whereby the cost of the assembled component—insert and insert adaptor—can be reduced compared to the equivalent component made entirely of brass. Moreover, insert adaptors having complex shapes for different applications can be made with a high degree of accuracy by injection moulding for assembly with the insert thereby avoiding expensive machining of the brass insert to produce the same shapes leading to further cost savings.

It will be understood that the embodiments described above are examples only of the application of the invention and are not intended to be limiting on the scope of the invention. Other combinations of insert and insert adaptor that can be employed without departing from the invention as described herein will be apparent to those skilled in the art. For example, the insert may be configured for co-operating with a clamping ring for use of the cable gland with armoured cable. Alternatively, the insert could be configured for use of the cable gland with cable having no armour. It is envisaged that an insert and insert adaptor as described herein may incorporate all or some of the features described to configure a cable gland for any desired application. It is also envisaged that the invention includes any novel feature of the cable glands described herein separately or in combination with any other novel feature and that all combinations of novel features described herein are considered to be within the scope of the invention.

Moreover, it will be understood that the invention can be used with any type of cable, for example fibre optic cable and is not limited to electric cable. Finally, the term "cable" is used herein for convenience to include cables, wires, pipes, tubes and other elongate elements and the scope of the invention is to be construed accordingly.

The invention claimed is:

1. A cable gland for a cable, the cable gland comprising: a body, an insert located within the body, the insert having an internal axial bore, and an adaptor provided with an axially extending tubular portion of the adaptor that is received in the bore of the insert, the adaptor and insert are provided with co-operating formations that engage when the tubular portion is inserted in the bore to connect the adaptor to the insert, wherein the co-operating formations are configured to interlock when engaged to resist withdrawal of the tubular portion from the bore.

2. The cable gland according to claim 1 wherein, a leading edge of the tubular portion is slightly chamfered to facilitate smooth insertion of the tubular portion into the bore of the insert.

3. The cable gland according to claim 1, wherein the axial bore extends from a first end face of the insert and the adaptor has an external abutment that locates against the first end face when the co-operating formations engage.

4. The cable gland according to claim 3 wherein, the first end face is configured to resist relative rotation between the insert and adaptor when the co-operating formations engage.

5. The cable gland according to claim 3 wherein, the axial bore of the insert comprises a counterbore terminating in an internal shoulder leading to an axial bore of reduced diameter that extends to a second end face of the insert.

6. The cable gland according to claim 5 wherein, the tubular portion has an internal diameter that matches the axial bore of reduced diameter.

7. The cable gland according to claim 1 wherein the adaptor is configured to provide or assist a sealing function within the gland.

8. The cable gland according to claim 7 wherein, the adaptor provides support for a cable seal.

9. The cable gland according to claim 7 wherein, the adaptor provides support for one end of a barrier sleeve for receiving a hardenable filler compound and provides a seal between the filler compound and the barrier sleeve.

10. The cable gland according to claim 7 wherein, the adaptor provides a seal for a cable.

11. The cable gland according to claim 10 wherein the seal is selected from the group a lip seal, a compression seal and a diaphragm seal.

12. The cable gland according to claim 1 wherein a set of adaptors is provided for assembly of the insert with any selected one of the set of adaptors to produce a required gland component.

13. In or for a cable gland, an insert and a set of insert adaptors, wherein the insert is connectable to any selected one of the set of insert adaptors to configure the insert to produce a required gland component for assembly of the cable gland, and wherein the selected insert adaptor has a tubular portion received in an axial bore of the insert, the tubular portion and axial bore having co-operating formations that are engageable to connect the insert and insert adaptor together and to resist axial separation of the insert and insert adaptor.

14. A cable gland for a cable, the cable gland comprising a body, an insert located within the body, the insert having an internal axial bore extending from an end face of the insert, and an adaptor having a tubular portion received in the axial bore and an abutment face locatable against the end face of the insert, wherein the tubular portion of the adaptor is adapted to connect the adaptor and the insert within the axial bore to resist axial separation of the insert and adaptor and the end face of the insert is adapted to resist relative rotation between the insert and adaptor.

15. A cable gland for a cable, the cable gland comprising: a body, an insert located within the body, the insert having an internal axial bore, and an adaptor provided with an axially extending tubular portion of the adaptor that is received in the bore of the insert, the adaptor and the insert provided with co-operating formations that engage when the tubular portion is inserted in the bore to connect the adaptor to the insert, the co-operating formations comprising an inwardly projecting annular rib on the inner surface of the bore of the insert having a transverse abutment face co-operable with a transverse abutment face on the tubular portion of the adaptor, wherein the co-operating formations interlock when engaged to resist withdrawal of the tubular portion from the bore and prevent axial separation of the insert and adaptor.

16. A cable gland according to claim 15, wherein the rib has a slightly chamfered face leading to the transverse abutment face for co-operating with tubular portion when the tubular portion is inserted in the bore to facilitate passage past the rib to engage the transverse abutment faces.

17. A cable gland for a cable, the cable gland comprising: a body, an insert located within the body, the insert having an internal axial bore, and an adaptor provided with positive location means arranged in use within the bore of the insert, the adaptor and the insert are provided with co-operating formations that engage when the tubular portion is inserted in the bore to connect the adaptor to the insert, the axial bore extending from a first end face of the insert and the adaptor has an external abutment that locates against the first end face when the co-operating formations engage, the first end face being knurled or serrated, wherein the knurls or serrations engage the tubular portion around the periphery of the bore at the first end face to resist relative rotation between the insert and adaptor when the co-operating formations engage,

18. A cable gland for a cable, the cable gland comprising: a body, an insert located within the body, the insert having an internal axial bore, and an adaptor provided with positive location means arranged in use within the bore of the insert, such that the insert and the adaptor interlock within the axial bore to connect and secure the adaptor to the insert, the insert being made of one of metal and alloy and the adaptor being made of one of plastics, elastomer and rubber.

19. A cable gland for a cable, the cable gland comprising: a body, an insert located within the body, the insert having an internal axial bore, and an adaptor provided with positive location means arranged in use within the bore of the insert such that the insert and adaptor interlock within the axial bore to connect and secure that adaptor to the insert, the adaptor being configured to provide or assist a sealing function within the gland and provide for a cable seal, wherein the cable seal and adaptor are permanently secured together.

20. The cable gland according to claim 1, wherein the adaptor supports a seal, and an end portion of the seal is trapped between the adaptor and the insert.

* * * * *